United States Patent [19] [11] 4,379,423
Leineweber et al. [45] Apr. 12, 1983

[54] HYDRAULIC AMPLIFIER

[75] Inventors: Günther Leineweber, Gifhorn; Rolf Warnecke, Winkel, both of Fed. Rep. of Germany

[73] Assignee: Volkswagenwerk AG, Wolfsburg, Fed. Rep. of Germany

[21] Appl. No.: 760,657

[22] Filed: Jan. 19, 1977

[30] Foreign Application Priority Data

Jan. 21, 1976 [DE] Fed. Rep. of Germany ....... 2602050

[51] Int. Cl.³ .............................................. F15B 9/10
[52] U.S. Cl. ....................................... 91/373; 60/552; 91/378
[58] Field of Search ................. 60/547, 548, 552, 582, 60/554, 593, 553; 137/625.68; 91/370, 372, 373, 376 R, 378

[56] References Cited

U.S. PATENT DOCUMENTS

| 2,407,097 | 9/1946 | Porter | 91/370 |
| 2,583,242 | 1/1952 | Turkenkopf . | |
| 2,916,882 | 12/1959 | Spalding . | |
| 2,946,195 | 7/1960 | Hare | 60/553 |
| 3,073,340 | 1/1963 | Hancock | 137/625.68 |
| 3,313,383 | 4/1967 | La Tendresse | 60/547 |
| 3,682,199 | 8/1972 | Bader . | |
| 3,802,568 | 4/1974 | Plura . | |
| 3,805,529 | 4/1974 | Lech | 60/547 |
| 3,827,242 | 8/1974 | Belart | 60/582 |
| 3,827,759 | 8/1974 | Belart | 60/582 |
| 3,845,693 | 11/1974 | Meyers | 60/548 |
| 3,899,890 | 8/1975 | Adams | 91/378 |

FOREIGN PATENT DOCUMENTS

| 2018805 | 11/1971 | Fed. Rep. of Germany . | |
| 2343882 | 8/1973 | Fed. Rep. of Germany . | |
| 2425472 | 1/1975 | Fed. Rep. of Germany . | |
| 2411879 | 9/1975 | Fed. Rep. of Germany . | |
| 49857 | 1/1918 | Sweden | 91/378 |
| 384678 | 12/1932 | United Kingdom | 60/547 |
| 1345951 | 2/1974 | United Kingdom | 60/547 |

OTHER PUBLICATIONS

ATZ (Automobiltechnische Zeitschrift), 75 (1973) 7, pp. 261-263.

Primary Examiner—Abraham Hershkovitz
Attorney, Agent, or Firm—Spencer & Kaye

[57] ABSTRACT

A hydraulic amplifier having a housing provided with pressure and return conduits, an amplifier piston, and a control slide. The piston is slidably arranged in an axial bore of the housing and itself has a blind axial bore within which the control slide is arranged. The piston and slide together constitute a unit which is free of pressure equalization and which is provided with two sets of passages for selectively placing the face of the piston in communication with the pressure and return conduits, respectively, depending on the axial position of the slide in the blind bore of the piston. The passages are asymmetrical with respect to the peripheral surface of the slide and are so constructed and arranged that whichever set of passages is closed, the slide is pressed radially against the closed passage under the influence of certain pressure differences which prevail in the hydraulic amplifier. This makes it possible to construct the component parts of the hydraulic amplifier with relatively coarse tolerances.

5 Claims, 2 Drawing Figures

HYDRAULIC AMPLIFIER

BACKGROUND OF THE INVENTION

The present invention relates to a hydraulic amplifier, particularly to an amplifier suitable for use in conjunction with the power braking system of a motor vehicle, in which an amplifier piston is slidably arranged within an axial bore of a housing, the piston itself having a blind bore within which there is a control slide capable of being actuated in a suitable manner, as, for example, by the brake pedal of the vehicle. The hydraulic amplifier is provided with passages which place the face of the amplifier piston in communication with either the pressure conduit or the return conduit, depending on the axial position of the slide within the amplifier piston.

Amplifiers used in conjunction with the power braking system of a motor vehicle are normally of the so-called vacuum type. In the case of vehicles driven by an internal combustion engine, and especially gasoline-driven spark-ignition engines, such power brakes are operated off the engine intake manifold. If the vacuum prevailing in the engine intake manifold is not sufficient, a vacuum pump, or auxiliary vacuum pump, may be used for producing the necessary vacuum; this is frequently the case where the internal combustion engine is of the Diesel type, i.e., an engine burning Diesel fuel and operating without spark plugs on the compression ignition principle. One major drawback of such vacuum type amplifiers is that they are relatively bulky and occupy a good deal of space. Hence, various types of hydraulic amplifiers have been developed and used in recent times, in which a hydraulic medium under pressure is used for the purpose of obtaining the desired power braking effect. One such hydraulic amplifier is shown, for example, in ATZ (Automobiltechnische Zeitschrift or Automotive Technical Journal) 75 (1973) 7, pages 261 to 263, particularly FIG. 2a on page 262. One significant advantage of such a hydraulic amplifier is that it can be made relatively small, and it has been found particularly practical to employ this type of hydraulic amplifier when the vehicle in which it is to be used is one that must in any event be provided with a source of hydraulic fluid under pressure. This will be the case if the vehicle is equipped, for example, with power steering or with an automatic leveling system.

A significant drawback of the heretofore known hydraulic amplifiers of the above type is that they are expensive to manufacture, especially in mass-production quantities. The reason for this is that the amplifier piston and the control slide are provided with symmetrical control passages and thus form a pressure-equalized unit. This, in turn, makes it essential that the piston and slide be manufactured to very close tolerances in order, firstly, to allow the slide to move readily within the axial bore of the piston and, secondly, to avoid leakage of the hydraulic medium which, in turn, would cause the pressure in the hydraulic pressure source to drop. To prevent such leakage, a coupling or disconnect valve is normally interposed in the conduit leading from the hydraulic amplifier to the source of fluid medium under pressure, this valve being closed whenever the brake is not actuated so as to hydraulically separate the piston-and-slide unit from the source of hydraulic pressure and/or the pressure reservoir or sump. This, in turn, requires the provision of additional structural means, such as an inclined tract carried by the amplifier piston, for opening the associated valve or valves whenever the brake is actuated.

It is, therefore, the primary object of the present invention to provide an hydraulic amplifier of the above type which avoids and overcomes the mentioned drawbacks, while functioning in a fully satisfactory manner.

BRIEF DESCRIPTION OF THE INVENTION

With the above object in view, the present invention resides, basically, in a hydraulic amplifier comprising a housing provided with pressure and return conduits, an amplifier piston, and a control slide. The piston is slidably arranged in an axial bore of the housing and itself has a blind axial bore within which the control slide is arranged. The piston and slide together constitute a unit which is free of pressure equalization and which is provided with passages for selectively placing the piston face in communication with the pressure and return conduits, depending on the axial position of the slide in the blind bore of the piston. These passages include first and second passage means for controlling the flow of hydraulic fluid through the pressure and return conduits, respectively. Each of the passage means is arranged asymmetrically with respect to the outer peripheral surface of the slide such that whichever passage means is, at any given time, closed is automatically tightly sealed as the result of radial displacement of the slide toward such closed passage means. The first and the second passage means are arranged such that when they are closed, the slide is pressed against them under the influence of a force resulting from the difference between the pressure prevailing in the region of said passage means and the pressure acting on the peripheral surface of the slide.

DETAILED DESCRIPTION OF THE PREFERRED EMBODIMENTS

Figure 1:
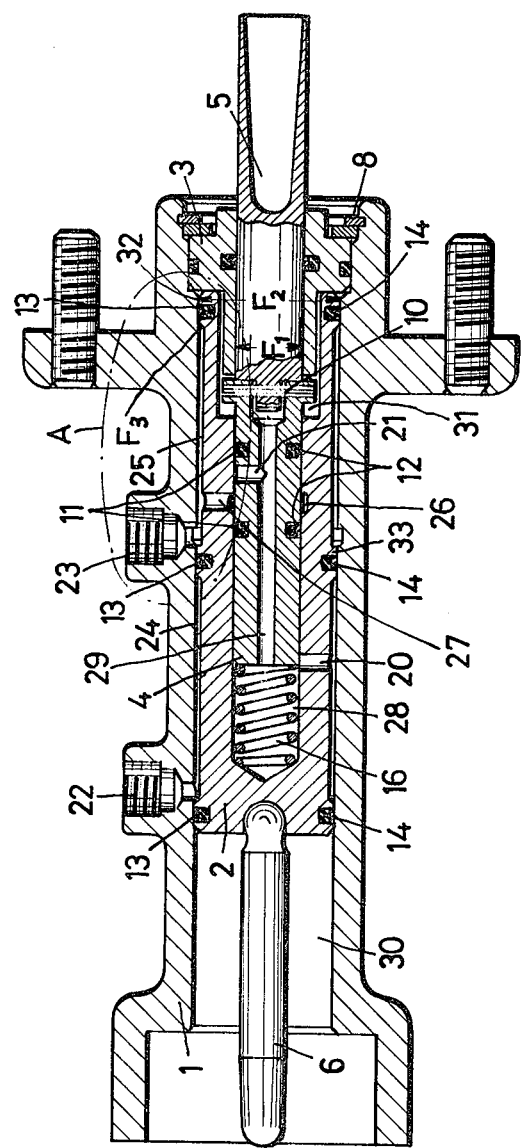
FIG. 1 is a longitudinal sectional view of a hydraulic amplifier according to the present invention.

Referring now to the drawings, the same show a hydraulic amplifier according to the present invention, the hydraulic amplifier comprising a valve casing or housing 1 which is provided with an axial bore 30. An amplifier piston 2 is arranged in the axial bore 30 so as to be axially slidable therein. The piston 2 itself is provided with an axially extending blind bore, within which there is arranged a control slide 4 which itself is axially slidable in this blind bore. The slide 4 can be displaced leftwardly, as viewed in the drawings, against the action of a compression spring 16 which is interposed between the left-hand end of the slide 4 and the bottom or dead end of the blind bore. This spring 16 exerts a force which tends to move the slide 4 out of the blind bore of the piston 2, so that if no other force is applied to the slide 4, the parts will occupy the position shown in the drawings.

The right end of slide 4 is connected to an actuating piston 5 by means of a locking pin 10 which establishes a positive connection between the parts 4 and 5. The piston 5 is slidably mounted in a guide sleeve 3 which is arranged in the right-hand end of the axial bore 30 of the housing 1, there being a conventional seal between the outer wall of sleeve 3 and the inner wall of housing 1. The sleeve 3 is held axially in place by a retaining ring 8. The piston 5 serves as a reaction piston which cooperates with the slide 4, and the right-hand end of the piston 5, again as viewed in the drawings, is connected to a mechanism (not shown) by means of which the piston 5, and hence the slide 4, can be moved leftwardly against the action of the spring 16. This mechanism can, in practice, be constituted by the connecting rod of the brake pedal of a power braking system of a motor vehicle, this connecting rod (not shown) being insertable into the blind opening that is provided at the right-hand end of the piston 5, as is conventional, for example, in the connection between a brake pedal and a master brake cylinder. In the illustrated embodiment, the left-hand end of the amplifier piston 2 is connected to a master brake cylinder of a hydraulic brake (not shown) by means of a force-transmitting push rod 6.

The outer peripheral surface of the amplifier piston 2 is provided with two annular grooves 24 and 25 which form two respective annular gaps between the outer surface of piston 2 and the inner wall of housing 1. These gaps are sealed off from each other as well as with respect to the inner wall of the housing 1 by appropriate sealing means; these sealing means may, as shown in the drawings, be constituted by a slidable polytetrafluoroethylene ring 13 which slides against the inner wall of housing 1 and which is pressed outwardly by an O-ring 14. The first groove 24 is in communication with a first stud 22 by means of which after removing the pedal force controlled pressure fluid is returned to a hydraulic fluid reservoir, while the second groove 25 is in communication with a second stud 23 by means of which fluid medium under pressure is supplied to the amplifier. The stud 22 is in communication with the hydraulic fluid reservoir (not shown) while the stud 23 is in communication with a source of hydraulic fluid under pressure (likewise not shown) and the studs 22 and 23 will, therefore, hereinafter be referred to as the return and pressure conduits, respectively.

It will be seen from the drawings that the annular grooves 24, 25 will be in communication with the studs 22, 23, respectively, irrespective of the axial position of the amplifier piston 2. Suitable radial passages are provided for placing these grooves 24, 25 in communication with the axial blind bore of piston 2. Specifically, the amplifier piston 2 is provided with two radial bores, one of them being the bore 27 which places the second groove 25 in communication with the upper region of the blind bore, the term "upper" being taken with respect to the "bottom" or dead end of the bore. In practice, this first radial bore 27 opens, at its inner end, into an annular groove 26 which surrounds the blind bore of piston 2. The other radial bore is shown at 20 and places the annular groove 24 in communication with the lower region of the blind bore of piston 2. The axial blind bore of the piston 2 includes a first chamber 28 on the "bottom" of this bore and a second chamber 31 on the upper end of this bore, which contains the piston face $F_2$ of the piston 2. The first and second chambers 28 and 31 are connected with one another by an axial bore 29 provided in the control slide 4.

The second radial bore 20 acts, in cooperation with the slide 4, as control passage and permits either to establish or to interrupt the communication, i.e. the pressure-wise connection, between the return conduit 22 and the first chamber 28 and the second chamber 31, respectively. That is to say, depending on the position of the slide relative to the piston 2, the flow of fluid from the first and second chambers 28 and 31 to the return conduit 22 can either be permitted or be prevented.

The first and second chambers 28 and 31 of the blind axial bore can, depending on the position of the parts, also be placed in communication with the pressure conduit 23 by way of said first radial bore 27 of the piston 2 and a third radial bore 21 of the slide 4. This third radial bore 21 acts as control passage too and permits, in cooperation with the piston 2, either to establish or to interrupt the communication, i.e. the pressure-wise connection, between the pressure conduit 23 and the axial bore 29 and hence between the pressure conduit 23 and first chamber 28 and second chamber 31, respectively.

The second radial bore 20, which serves to allow the flow of hydraulic fluid from the return conduit 22 into the blind bore, is so axially positioned that, at least when the slide 4 is inserted as far as possible into the blind bore of piston 2, the bore 20 will be closed off by the wall of the slide 4. The third radial bore 21, on the other hand, is axially so positioned that, when the bore 20 is closed off and at least when the control slide 4 has been fully inserted into the blind bore of piston 2, it will be in communication with the annular groove 26 of the amplifier piston 2.

It will be seen that, in the illustrated embodiment, the radial bore 20 is axially so positioned that it will be closed off even before the slide 4 has been completely inserted into the blind bore. Moreover, there is a certain overlap between the closing off of the radial bore 20 and the opening of the radial bore 21, that is to say, the radial bore 21 is not opened immediately after the radial bore 20 has been closed off but only a short time afterwards, The unit constituted by the amplifier piston 2 and the control slide 4 is, in accordance with the present invention, capable of being constructed in such a way that the blind axial bore of piston 2 and the control slide do not have to adhere to close tolerances but can make do instead with coarse tolerances, as a result of which no provision need be made for pressure equalization, i.e., it is not necessary to build the unit 2, 4 as a pressure-equalized structural entity. This is accomplished by arranging each of the control passages which places the blind bore of piston 2 in communication with the return and pressure conduits 22, 23, rotationally asymmetrically, i.e., asymmetrically with respect to the circumference or peripheral surface of the slide 4 (or piston 2). Thus, in the illustrated embodiment, there is but one radial passage, namely, bore 20, for placing the blind bore of piston 2 in communication with the return conduit 22, and there is but one radial passage, namely, bore 21 in slide 4, for placing the blind bore in communication with the pressure conduit 23. It will be noted that the radial passage from chamber 28 to pressure conduit 23 is formed whenever the bores 21 and 27 are in axial alignment with each other, it being immaterial, thanks to the provision of channel 26, that they be in radial alignment in order to establish the radial passage. As is shown in the drawings, the outer end of the bore constituting the radial passage section 21, as well as the inner end of the bore constituting the radial passage 20, each open at the inner wall of the blind bore of the piston 2. Both control passages, namely second radial bore 20 and third radial bore 21 respectively, are concentrated on a relatively small portion of the periphery of the control slide 4 or the blind axial bore of the amplifier piston 2.

To insure proper sealing, the control slide 4 is provided with two seals located axially on opposite sides of bore 21 each of these seals being in the form of a polytetrafluoroethylene ring 11 sliding against the inner surface of the amplifier piston 2 and an O-ring 12.

As stated above, when no force is applied to the amplifier, as is the case, for example, when no braking force is applied to the brake pedal (not shown) with which the amplifier may be associated, the amplifier piston 2 and the slide 4 will occupy the position shown in the drawings. Let it now be assumed that a brake force is applied and that the pressure piston 5 causes the control slide 4 to move leftwardly further into the interior of the blind bore of piston 2 against the force of the spring 16. In the course of this leftward travel of slide 4, the radial bore 20 will be closed off, and, depending on the relative axial positions of the bores 20 and 21 and hence their respective overlap if any, the radial bore 21 will be opened, either simultaneously with the closing of the bore 20 or a short time thereafter. As a result, fluid medium under pressure will flow in through the pressure conduit 23, and from there into the annular groove 25, the radial bore 27, the annular groove 26 and from there into the radial bore 21 and hence, via axial bore 29, into the chamber 28. The fluid under pressure will likewise flow via axial bore 29 into the second chamber 31 which contains the piston face $F_2$ of the amplifier piston 2. As a result, the pressure exerted by the hydraulic medium on the entire piston face $F_2$ will cause an amplified braking pressure to be applied to the piston 2 and cause it to move leftwardy. This motion is imparted to the force-transmitting push rod 6 which, as stated above, may be connected to the master cylinder of a hydraulic braking system.

The extent to which the amplifier piston amplifies the braking force is determined by the ratio of the size of the amplifier piston surface $F_2$ to the size of the pressure piston surface $F_1$. The pressure action on this surface $F_1$ will, incidentally, produce a reaction force, which will always be in equilibrium with the actuating force exerted by the brake pedal. The hydraulic amplifier is an amplifier in which the actuating force acting on push rod 6 is proportional to the pedal force without any dependance on its position. The length of travel of the amplifier piston 2 will depend solely on the characteristics of the master cylinder with which the force-transmitting push rod 6 is associated, which, in turn, will depend on the volume-to-pressure ratio of the associated brake system.

While the parts are in the last-described position, i.e., so long as the slide 4 occupies a position in which it is sufficiently far inserted into the blind bore of piston 2, the bore 20, which serves to control the pressure-wise connection between chamber 28 and return conduit 22, will be tightly sealed despite a coarse fit between the slide 4 and amplifier piston 2, which coarse fit is the result of the coarse tolerances allowed during the manufacture of these parts. This is so because, with the parts in the position just described, the slide is displaced radially in the direction towards the bore 20 which means that the slide 4 will come to lie firmly against the inner wall of the axial bore at the point where the bore 20 opens into the blind bore of piston 2, thereby tightly sealing the bore 20. This radial displacement of the slide 4 is the result of the fact that the amplifier is free of pressure equilization because of the asymmetrical arrangement of the radial passage means—in this case the second radial bore 20—which controls the flow of fluid with respect to the return conduit. As stated above, the term "asymmetric" is taken with respect to the periphery of the slide 4, or rotational asymmetry. During this position of the parts, the pressure acting on the peripheral surface of the control slide 4 which is upstream of the immediate region of the radial bore 20 will be the pressure of the fluid coming in through the pressure conduit 23, whereas the pressure acting in the immediate region of the radial bore 20 will be the pressure prevailing in the annular groove 24, namely, the pressure in the return line 22. The latter is, for example, atmospheric pressure and in any event is substantially lower than the pressure of the fluid in the pressure conduit 23, thus giving rise to an effective pressure difference. Because of said asymmetrical arrangement—there being, in the illustrated embodiment, but one radial bore 20 rather than a number of peripherally evenly distributed radial bores—this pressure difference brings about a force component which causes the control slide 4 to be radially displaced, as stated above. This radial displacement will seal off the bore 20 to such an extent that there will be virtually no leakage of hydraulic fluid.

When no force is any longer applied to the pressure piston—this being the case, for example, when the foot is taken off the brake pedal—the control slide 4 is moved rightwardly out of the blind bore of piston 2, this movement taking place under the influence of the spring 16 as well as under the influence of the prevailing hydraulic pressure. The bore 21, which controls the flow of fluid from the pressure conduit, will first be closed off, after which the bore 20, which controls the flow of the return fluid, will be opened. The servopressure is thus reduced, and the amplifier piston 2 will be returned to its starting position illustrated in the drawings, regardless of the forces acting on the force-transmitting push rod 6.

Figure 2:
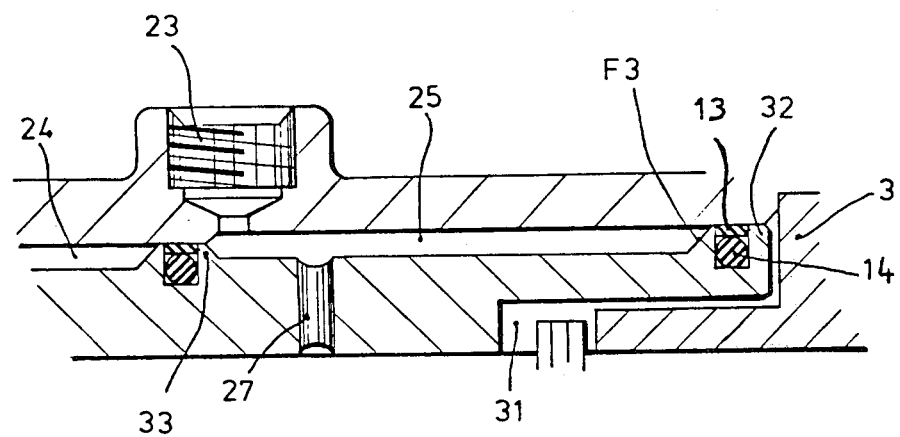
FIG. 2 is an enlarged sectional view of the detail "A" of FIG. 1.

As best seen in FIG. 2, the diameter of the bore 30 in housing 1 is advantageously stepped such that the land portion 33 of the amplifier piston 2 which separates the two annular grooves 24 and 25 has a smaller diameter than the land portion 32 of the piston 2 which serves as the second boundary of the groove 25. In this way, the annular surface $F_3$ which is larger than that of the land 33 is constantly exposed to the pressure prevailing in the pressure conduit 23, so as to bring to bear on the piston 2 a force which tends to move it back into its rest position, i.e., rightwardly as viewed in the drawings. As soon as the control slide 4 has been moved out of the blind bore of piston 2 sufficiently far so that the radial bore 21 is no longer in communication with the annular groove 26, the control slide 4 will once more be displaced radially, it now being this radial bore 21 which will be tightly sealed. The pressure prevailing in the chamber bounded by the two sealing arrangements 11, 12 and acting on the peripheral surface of the slide 4 will be the pressure which prevails in the pressure conduit. Only in the region of the radial bore 21, which is in communication with the return conduit 22 via the axial bore 29 and the now open radial bore 20, will the pressure be substantially less, so that once again, thanks to the asymmetrical arrangement of the passage means in question—i.e., the presence of but one radial bore 21 rather than a number of peripherally evenly distributed radial bores—there will come into being a radial force component which is caused by a pressure difference and which presses the slide 4 against the passage 21, thereby effectively sealing the same.

It will thus be seen that, thanks to the present invention, there is provided a hydraulic amplifier which can be made of parts which themselves need not be manufactured to precise tolerances. Despite the presence of coarse tolerances in the essential components of the amplifier, there will be no leakage, or only very little leakage. Nor is it necessary to provide any separate coupling or disconnect valves or the like between the amplifier and the source of hydraulic fluid under pressure and/or the pressure reservoir.

It will be understood that the above description of the present invention is susceptible to various modifications, changes and adaptations, and the same are intended to be comprehended within the meaning and range of equivalents of the appended claims.

What is claimed is:

1. A hydraulic amplifier comprising:
   (a) a housing having an axial bore as well as a pressure conduit and a return conduit;
   (b) an amplifier piston arranged axially slidably in said bore, said piston having a piston face and a blind axial bore;
   (c) a control slide axially slidably arranged in said blind bore of said piston;
   (d) said piston and slide together constituting a unit being provided with passages for placing said piston face in communication with said pressure and return conduits, respectively, said passages including first and second passage means for selectively controlling the communication between said piston face and said pressure and return conduits, respectively, i.e. the flow of hydraulic fluid through said pressure and return conduits, respectively, depending on the axial position of said slide in said bore of said piston;
   (e) said unit being free of pressure equalization by arranging each of said first and second passage means asymmetrically with respect to the peripheral surface of said slide;
   (f) each of said first and second passage means being arranged such that whichever passage means is, at any given time, closed, it is automatically tightly sealed as a result of radial displacement of said slide towards such closed passage means, said radial displacement being actuated by a radial force resulting from the difference between the lower pressure prevailing in the immediate region of said closed passage means and the higher pressure acting on the peripheral surface of said slide upstream of said immediate region.

2. A hydraulic amplifier as defined in claim 1, wherein each of said first and second passage means includes but a single radial passage.

3. A hydraulic amplifier as defined in claim 2, wherein one end of each radial passage means opens at the inner wall of said blind axial bore of said piston.

4. A hydraulic amplifier as defined in claim 2 wherein
   (a) the outer surface of said piston has a first annular groove which is in communication with said return conduit and a second annular groove which is in communication with said pressure conduit;
   (b) said piston having, in its upper region where said second outer annular groove is located, a first radial bore which places said second outer annular groove in communication with an inner annular groove, said piston further having, in its lower region where said first outer annular groove is located, a second radial bore which represents said second passage means and which places said first outer annular groove in communication with said blind axial bore of said piston, said second radial bore being axially so positioned as to be closed by the outer wall of said slide at least when the latter has been fully inserted into said blind axial bore of said piston;
   (c) said slide having an axial bore which places a first chamber of said blind bore of said piston which is located below said slide in communication with a second chamber which itself surrounds said piston face, said slide having a third radial bore which communicates with said axial bore of said slide and which represents said first passage means, said third radial bore being axially so arranged as to be in axial alignment with said inner annular groove of said piston when said second radial bore has been closed by said outer wall of said slide;
   (d) said slide further comprising sealing means arranged and located axially on opposite sides of said third radial bore.

5. A hydraulic amplifier as defined in claim 4, wherein said axial bore of said housing is stepped, and wherein said piston has a first land portion which separates said first and second outer annular grooves of said piston and a second land portion which forms the second boundary of said second outer annular groove, said first land portion having a diameter which is smaller than that of said second land portion.

* * * * *